United States Patent
Kobayashi

(10) Patent No.: US 10,469,672 B2
(45) Date of Patent: Nov. 5, 2019

(54) IMAGE FORMING APPARATUS

(71) Applicant: KYOCERA Document Solutions Inc., Osaka (JP)

(72) Inventor: Yasuyoshi Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/168,321

(22) Filed: Oct. 23, 2018

(65) Prior Publication Data

US 2019/0166259 A1    May 30, 2019

(30) Foreign Application Priority Data

Nov. 27, 2017  (JP) ................. 2017-226647

(51) Int. Cl.
*H04N 1/04*   (2006.01)
*H04N 1/00*   (2006.01)
*H04N 1/10*   (2006.01)
*H04N 1/028*  (2006.01)

(52) U.S. Cl.
CPC ..... *H04N 1/00013* (2013.01); *H04N 1/00031* (2013.01); *H04N 1/00068* (2013.01); *H04N 1/00811* (2013.01); *H04N 1/1013* (2013.01); *H04N 1/02815* (2013.01); *H04N 2201/0081* (2013.01)

(58) Field of Classification Search
None
See application file for complete search history.

(56) References Cited

U.S. PATENT DOCUMENTS

| 8,482,818 B2 * | 7/2013 | Maruo | H04N 1/0071 358/1.9 |
| 9,832,332 B2 * | 11/2017 | Sunako | H04N 1/00689 |
| 2011/0228347 A1 * | 9/2011 | Kohara | G03G 15/36 358/446 |
| 2012/0140298 A1 * | 6/2012 | Tsunoda | H04N 1/407 358/518 |
| 2017/0199488 A1 * | 7/2017 | Maeda | G03G 15/5062 |

FOREIGN PATENT DOCUMENTS

JP    2000-151917 A    5/2000

* cited by examiner

*Primary Examiner* — Henok Shiferaw

(74) *Attorney, Agent, or Firm* — Stein IP, LLC

(57) ABSTRACT

An image forming apparatus, with a document cover open and in addition with no document placed on a contact glass, without performing printing operation, performs first test reading where the contact glass is read without a light source being turned on; thereafter, performs the printing operation, and performs second test reading where the contact glass is read without the light source being turned on. The image forming apparatus checks a flicker level based on a first comparison value calculated based on image data acquired in the first test reading and a second comparison value calculated based on image data acquired in the second test reading.

6 Claims, 7 Drawing Sheets

IMAGE FORMING APPARATUS

INCORPORATION BY REFERENCE

This application is based upon and claims the benefit of priority from the corresponding Japanese Patent Application No. 2017-226647 filed on Nov. 27, 2017, the entire contents of which are incorporated herein by reference.

BACKGROUND

The present disclosure relates to an image forming apparatus incorporating an image reading portion.

Conventionally, image forming apparatuses incorporating an image reading portion are known. Some conventional image forming apparatuses incorporate an image reading portion having a fluorescent lamp as a light source, and are configured to be able to detect the flicker of the light source of the image reading portion. These conventional image forming apparatuses detect the flicker of the light source of the image reading portion, and, based on the result of detection, perform abnormality detection on the light source of the image reading portion.

SUMMARY

According to one aspect of the present disclosure, an image forming apparatus includes an image reading portion, a document cover, a printing portion, and a control portion. The image reading portion includes a light source which radiates light toward a contact glass, and reads the contact glass to generate image data. The document cover is supported to be openable and closable with respect to the contact glass. The printing portion conveys a sheet fed into a sheet conveyance passage, and prints an image on the sheet while conveying it. The control portion controls the image reading portion and the printing portion. The control portion, with the document cover open and in addition with no document placed on the contact glass, without making the printing portion perform printing operation, makes the image reading portion perform first test reading in which the contact glass is read without the light source being turned on, and after completion of the first test reading, the control portion makes the printing portion perform the printing operation, and makes the image reading portion perform second test reading in which the contact glass is read without the light source being turned on. The control portion, based on first image data acquired in the first test reading, calculates a first comparison value representing the brightness of illumination light from a lighting device installed at a place where the image forming apparatus is installed, and, based on second image data acquired in the second test reading, calculates a second comparison value representing the brightness of the illumination light from the lighting device. The control portion, based on the first and second comparison values, checks whether or not a flicker level indicating the intensity of the flicker of the illumination light from the lighting device exceeds a permissible level.

DETAILED DESCRIPTION

A description will be given of an image forming apparatus according to one embodiment of the present disclosure. The following description deals with, as an example, a multifunction peripheral having a plurality of functions such as a scanning function and a printing function.

Figure 1:
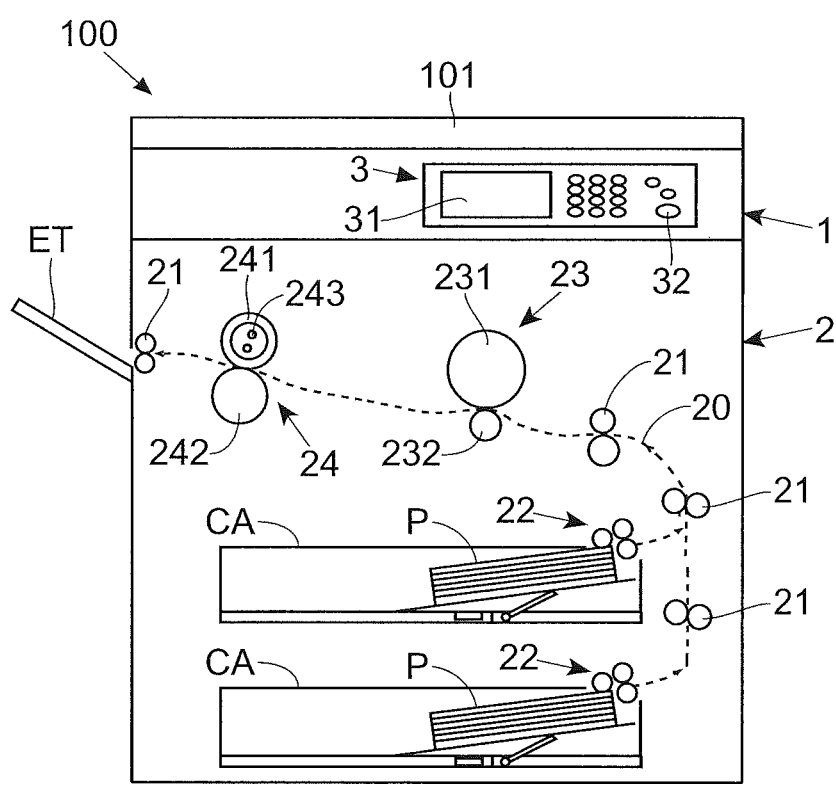
FIG. 1 is a schematic diagram showing a structure of a multifunction peripheral according to one embodiment of the present disclosure.

Structure of Multifunction Peripheral:

As shown in FIG. 1, the multifunction peripheral 100 according to this embodiment includes an image reading portion 1 and a printing portion 2. The multifunction peripheral 100 is provided with an operation panel 3.

Figure 2:
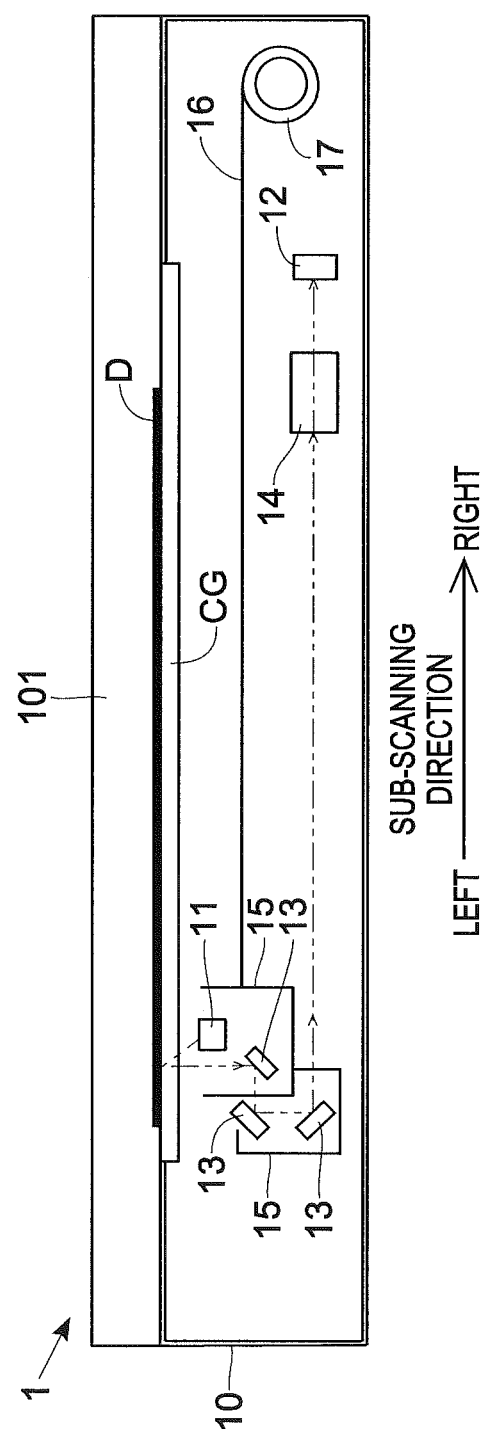
FIG. 2 is a diagram showing a structure of an image reading portion in the multifunction peripheral according to one embodiment of the present disclosure.

As shown in FIG. 2, the image reading portion 1 has a contact glass CG. The contact glass CG is arranged in an opening formed in the top face of a housing 10 of the image reading portion 1. The image reading portion 1 reads the contact glass CG, and generates image data. When a document D is placed on the contact glass CG, image data of the document D placed on the contact glass CG is generated.

The image reading portion 1 includes a light source 11, an image sensor 12, a mirror 13, and a lens 14. These members of the image reading portion 1 are housed inside the housing 10 of the image reading portion 1 (that is, they are arranged on the bottom face side of the contact glass CG opposite from the top face side of it).

The light source 11 has a plurality of LED (light-emitting diode) elements (unillustrated). The plurality of LED elements are arranged in a row extending in the main scanning direction (the direction perpendicular to the plane of FIG. 2). The light source 11 radiates light toward the contact glass CG. The light traveling toward the contact glass CG is transmitted through the contact glass CG. When a document D is placed on the contact glass CG, the light transmitted through the contact glass CG is reflected on the document D. Even when no document D is placed on the contact glass CG, if a document cover 101, which will be described later, is closed, the light transmitted through the contact glass CG is reflected on the document cover 101.

The image sensor 12 has a plurality of photoelectric conversion elements arranged in a row extending in the main scanning direction. The image sensor 12 receives light from the contact glass CG. When a document D is placed on contact glass CG or when the document cover 101 is closed, the light reflected from the document D or the document cover 101 travels toward the image sensor 12. When no document D is placed on the contact glass CG and in addition when the document cover 101 is open, illumination light from a lighting device 200 (see FIGS. 4 and 7) installed at the place where the multifunction peripheral 100 is installed travels from the contact glass CG to the image sensor 12. The image sensor 12, on receiving light from the contact glass CG while reading is performed, performs photoelectric conversion and stores electric charge in each pixel, line-by-line, and outputs analog signals according to the stored electric charge.

The mirror 13 reflects light from the contact glass CG toward the lens 14. The lens 14 converges light reflected from the mirror 13, and directs it to the image sensor 12.

The light source 11 and the mirror 13 are arranged in a moving frame 15 which is movable in the sub-scanning direction orthogonal to the main scanning direction. The moving frame 15 is coupled to a wire 16. The wire 16 is wound around a winding drum 17. As the winding drum 17 rotates, the moving frame 15 moves in the sub-scanning direction. That is, the light source 11 and the mirror 13 move in the sub-scanning direction.

Figure 3:
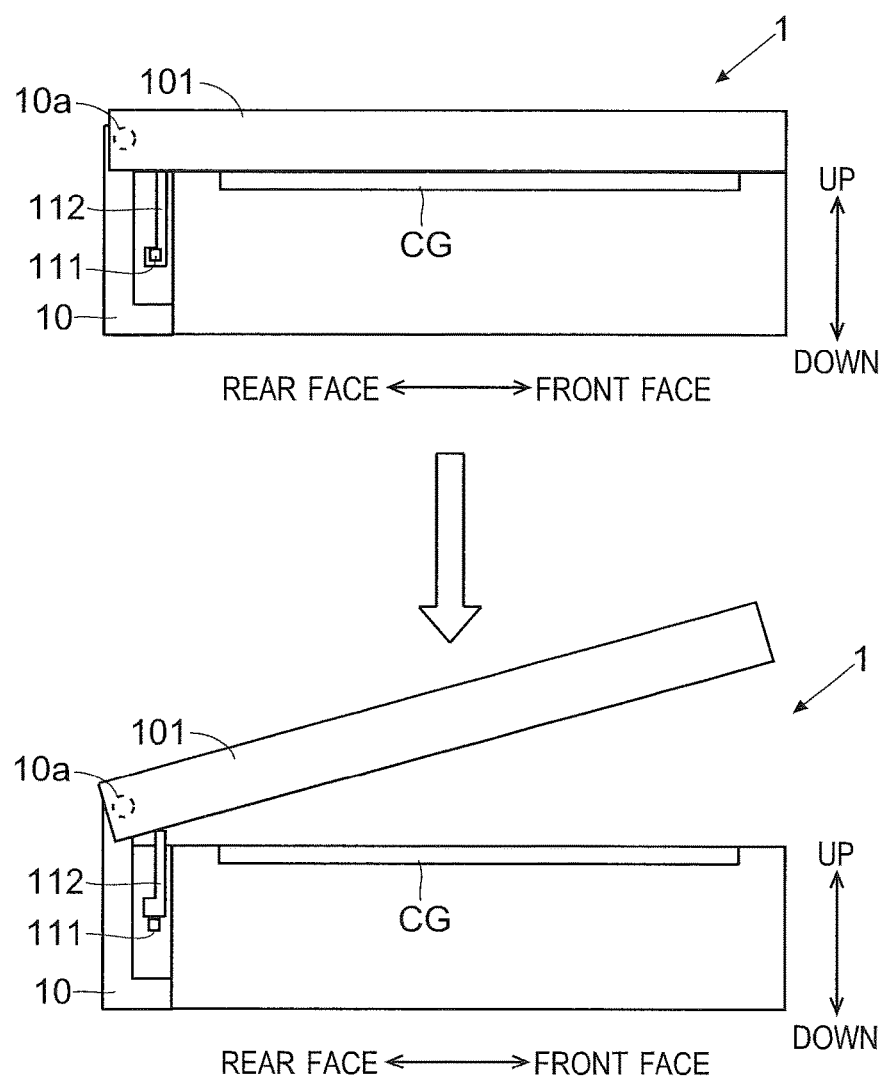
FIG. 3 is a diagram showing a document cover provided in the multifunction peripheral according to one embodiment of the present disclosure as observed when the document cover changes from a closed state to an open state.

As shown in FIG. 3, to the housing 10, the document cover 101 is fitted. The document cover 101 opens and closes with respect to the top face of the housing 10 (the top face of the contact glass CG). To enable the document cover 101 to open and close, a rotation shaft 10*a* is provided on the rear face side of the housing 10. The document cover 101 is supported swingably on the rotation shaft 10*a* of the housing 10.

The document cover 101 is opened and closed manually by the user. Generally, the user, when making the multi-function peripheral 100 perform a job involving reading of a document D (for example, a copy job), opens and closes the document cover 101 to place the document D on the contact glass CG. That is, the user opens the document cover 101, then places the document D on the contact glass CG, and then closes the document cover 101.

To detect weather the document cover 101 is open or closed, an open-close sensor 111 is provided in the housing 10. For example, the open-close sensor 111 is an optical sensor having a light emitting portion and a light receiving portion. The open-close sensor 111 takes as a detection target an actuator 112 which is movable in the up-down direction between the light emitting portion and the light receiving portion. By an unillustrated biasing member, the actuator 112 is biased upward all the time.

When the document cover 101 is completely closed (see the upper part of FIG. 3), the actuator 112 does not protrude beyond the top face of the contact glass CG. Here, the optical path of the open-close sensor 111 is obstructed by the actuator 112. For example, when the optical path of the open-close sensor 111 is obstructed, the output value of the open-close sensor 111 is a first level (one of High and Low levels).

As the document cover 101 is opened from the state where the document cover 101 is completely closed, the actuator 112 moves upward. Then, when the document cover 101 is open such that the inclination angle of the document cover 101 (the angle between the document cover 101 and the top face of the contact glass CG) equals a predetermined angle (see the lower part of FIG. 3), the actuator 112 is located out of the optical path of the open-close sensor 111. Thus, the output value of the open-close sensor 111 changes from the first level to a second level (the other of High and Low levels).

Then, when the document cover 101 is completely open, although no illustration is given here, the actuator 112 is located farther upward (the output value of the open-close sensor 111 is still the second level). When the document cover 101 is, from the state where the document cover 101 is completely open, closed such that the inclination angle of the document cover 101 equals a predetermined angle, the output value of the open-close sensor 111 changes from the second level to the first level.

In a job involving reading of a document D, first, the user performs opening-closing operation with respect to the document cover 101. As a result, as shown in FIG. 2, the document D is placed on the contact glass CG with the document cover 101 closed. When the job is started, the moving frame 15 moves in the sub-scanning direction (the direction from left to right as seen from in front). Then, while the moving frame 15 is moving in the sub-scanning direction, the light source 11 radiates light toward the contact glass CG. The image sensor 12 continuously and repeatedly performs photoelectric conversion on the light reflected from the document D. In this way, the document D is read line-by-line.

Here, a document conveying unit which conveys a document D can be used as the document cover 101. In this case, it is possible to make the image reading portion 1 perform feed-reading in which a document D conveyed automatically by the document conveying unit is read.

With reference back to FIG. 1, when a job involving printing (for example, a copy job) is performed, the printing portion 2 conveys a sheet P, and forms a toner image (an image) based on image data of an image to be printed. Then, the printing portion 2, while conveying the sheet P, transfers (prints) the toner image to (on) the sheet P. The sheet P conveyed while the printing job is being performed is discharged onto a discharge tray ET. For example, the printing portion 2 performs printing based on image data of a document D read by the image reading portion 1.

The printing portion 2 has a sheet conveyance passage 20 (indicated by the broken-line arrow in FIG. 1) and a plurality of conveying roller pairs 21 for conveying a sheet P along the sheet conveyance passage 20. The printing portion 2 includes a sheet feed portion 22, an image forming portion 23, and a fixing portion 24.

The sheet feed portion 22 feeds sheets P stored in a sheet cassette CA into the sheet conveyance passage 20. A sheet P fed to the sheet conveyance passage 20 is conveyed toward a transfer nip (the printing position).

The image forming portion 23 includes a photosensitive drum 231 and a transfer roller 232. Although no illustration is given here, the image forming portion 23 includes a charging device which electrostatically charges the circumferential surface of the photosensitive drum 231, an exposing device which forms an electrostatic latent image on the circumferential surface of the photosensitive drum 231, a developing device which develops into a toner image the electrostatic latent image on the circumferential surface of the photosensitive drum 231, and the like. The photosensitive drum 231 and the transfer roller 232 are in pressed contact with each other, and form the transfer nip (the position of the transfer nip is the printing position).

The image forming portion 23 transfers the toner image to the sheet P that passes through the transfer nip. The roller pair including the photosensitive drum 231 and the transfer roller 232 serves also to convey the sheet P in the sheet conveyance passage 20.

The fixing portion 24 includes a heating roller 241 and a pressing roller 242. The heating roller 241 incorporates a heater 243. For example, the heater 243 is a halogen heater. The heater 243 receives supply of AC power and produces heat to heat the heating roller 241. The pressing roller 242 is in pressed contact with the heating roller 241, and forms a fixing nip with the heating roller 241 (the position of the fixing nip is the fixing position).

The fixing portion 24 heats and presses the sheet P (the sheet P having the toner image transferred to it) passing through the fixing nip, and thereby fixes the toner image to the sheet P. The roller pair including the heating roller 241 and the pressing roller 242 serves also to convey the sheet P in the sheet conveyance passage 20.

The operation panel 3 includes a touch screen 31 and hardware buttons 32. The touch screen 31 displays setting screens on which software buttons are arranged, and accepts various settings made by the user. The touch screen 31 also displays messages to give the user various notifications. A plurality of hardware buttons 32 are provided on the operation panel 3. The hardware buttons 32 include, among others, a Start button for receiving from the user an instruction for execution of a job.

Figure 4:
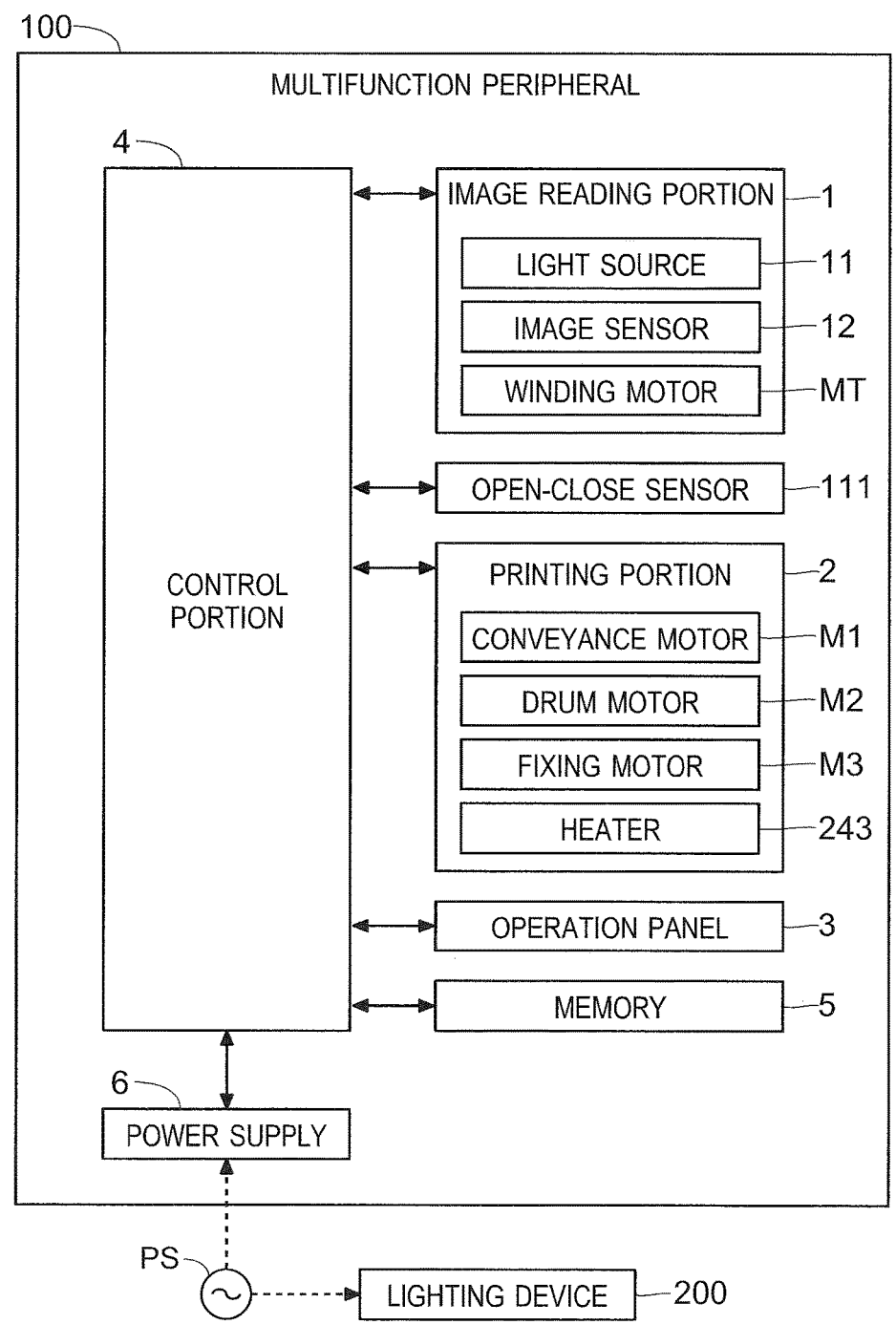
FIG. 4 is a block diagram showing a configuration of the multifunction peripheral according to one embodiment of the present disclosure.

As shown in FIG. 4, the multifunction peripheral 100 includes a control portion 4 and a memory 5. The control portion 4 includes a CPU. The control portion 4 operates based on control programs and data, and executes processes for controlling relevant blocks in the multifunction peripheral 100. The memory 5 includes a non-volatile memory (ROM) and a volatile memory (RAM). The control programs and data are stored in the ROM, and are loaded into the RAM.

The image reading portion 1 is connected to the control portion 4. The control portion 4 controls the image reading portion 1. The control portion 4 controls the light on-off operation of the light source 11 and the reading operation of the image sensor 12. The control portion 4 also controls a winding motor MT for rotating the winding drum 17 to move and stop the winding drum 17 so as to appropriately move, in the sub-scanning direction, the moving frame 15 to which the light source 11 and the mirror 13 are fitted.

The control portion 4 executes a process for amplifying image data (the analog output of the image sensor 12) acquired by reading by the image reading portion 1 and a process for converting the image data from analog to digital data. Here, a data processing portion which executes these processes can be provided separately from the control portion 4.

The control portion 4 performs various image processing (such as enlargement-reduction processing, rotation processing, and concentration conversion processing) on the image data of the document D read by the image reading portion 1. To make the control portion 4 perform such image processing, for example, the control portion 4 incorporates an image processing circuit and an image processing memory.

The control portion 4 is connected also with the open-close sensor 111. The control portion 4 detects whether the document cover 101 is open or closed based on the output value of the open-close sensor 111. The control portion 4, on detecting that the output value of the open-close sensor 111 has changed from the first level to the second level, that is, that the optical path of the open-close sensor 111 has changed from an obstructed state to an unobstructed state, judges that the document cover 101 has changed from an open state to a closed state. On the other hand, the control portion 4, on detecting that the output value of the open-close sensor 111 has changed from the second level to the first level, that is, that the optical path of the open-close sensor 111 has changed from the unobstructed state to the obstructed state, judges that the document cover 101 has changed from the open state to the closed state.

The printing portion 2 is connected to the control portion 4. The control portion 4 controls the printing portion 2. The control portion 4 controls the sheet feeding operation of the sheet feed portion 22, the image forming operation of the image forming portion 23, and the fixing operation of the fixing portion 24. The control portion 4 controls a motor for rotating various rotary members serving to convey the sheet P (controls the sheet P conveying operation by the printing portion 2). Such motors include a conveyance motor M1 for rotating the conveying roller pairs 21, a drum motor M2 for rotating the photosensitive drum 231, and a fixing motor M3 for rotating the heating roller 241.

The operation panel 3 is connected to the control portion 4. The control portion 4 controls the displaying operation of the operation panel 3, and detects operations performed on the operation panel 3 (a touching operation on the touch screen 31 and a pressing operation on the hardware buttons 32).

The multifunction peripheral 100 includes a power supply 6 connected to a commercial power source PS (AC power source). The power supply 6 generates a voltage sufficient to make operate power-fed portions (portions which operate by receiving supply of electric power) in the multifunction peripheral 100. The image reading portion 1, the printing portion 2, the operation panel 3, the control portion 4, and the memory 5 correspond to the power-fed portions.

The multifunction peripheral 100 is installed in a room. At a place where the multifunction peripheral 100 is installed, the lighting device 200 such as a fluorescent lamp is installed (for example, on the ceiling of the room). The lighting device 200 operates by receiving supply of electric power from the commercial power source PS.

The power supply 6 is connected to the control portion 4. The control portion 4 controls the supply of electric power from the power supply 6 to the power-fed portions. To the heater 243, AC power from the commercial power source PS is fed via the power supply 6.

Here, the control portion 4 performs power supply control by turning on and off the supply of electric power to the heater 243. Thus, although no illustration is given, the power supply 6 is provided with a power supply control circuit. The power supply control circuit of the power supply 6 includes a switching device to switch on and off the supply of electric power to the heater 243. The control portion 4 outputs a power supply control signal to the power supply control circuit of the power supply 6, and accordingly switches on and off the supply of electric power to the heater 243. The control portion 4 controls the supply of electric power to the heater 243, and thereby raises the temperature of the heating roller 241 to a predetermined fixing control temperature, and keeps the temperature of the heating roller 241 at the fixing control temperature.

The control portion 4 performs selectively either half-wave control or phase control as the power supply control with respect to heater 243. In the half-wave control, the supply of electric power is switched on and off in units of half-waves of the AC waveform. On the other hand, in the phase control, the supply is switched on and off in units of arbitrary phase angles within a half-wave of the AC waveform while the on-period is increased gradually.

Flicker Reduction Mode:

When the power supply control with respect to the heater 243 is performed by the phase control method, as compared with the half-wave control method, the time taken for the temperature of the heating roller 241 to reach the fixing control temperature is longer. Thus, when the mode for the power supply control method is set to a normal mode, the control portion 4 performs the power supply control by the half-wave control method. On the other hand, when the power supply control by the control portion 4 is performed by the half-wave control method, as compared with the phase control method, the illumination light from the lighting device 200 is more likely to flicker due to variation in the supply voltage resulting from variation in consumed electric power.

Thus, the mode for the power supply control method includes a flicker reduction mode in addition to the normal mode. The flicker reduction mode is a mode for reducing the flicker of the illumination light from the lighting device 200. When the normal mode changes to the flicker reduction mode, the power supply control by the control portion 4 switches from the half-wave control method to the phase control method.

Here, the multifunction peripheral 100 incorporates a flicker check function. When the user gives the multifunction peripheral 100 an instruction to perform the flicker check function (the instruction is accepted on the operation panel 3), the multifunction peripheral 100 enters a flicker check mode.

On entering the flicker check mode, the control portion 4 performs a flicker checking process. In the flicker checking process performed by the control portion 4, the flicker level indicating the intensity of the flicker (the noticeability of the flicker) of the illumination light from the lighting device 200 is checked. Then, if the flicker level of the illumination light from lighting device 200 exceeds a predetermined permissible level (if the flicker level of the illumination light from the lighting device 200 is high), the control portion 4 switches from the normal mode to the flicker reduction mode. After entering the flicker reduction mode, the control portion 4 performs the power supply control with respect to the heater 243 by the phase control method.

Figure 5:
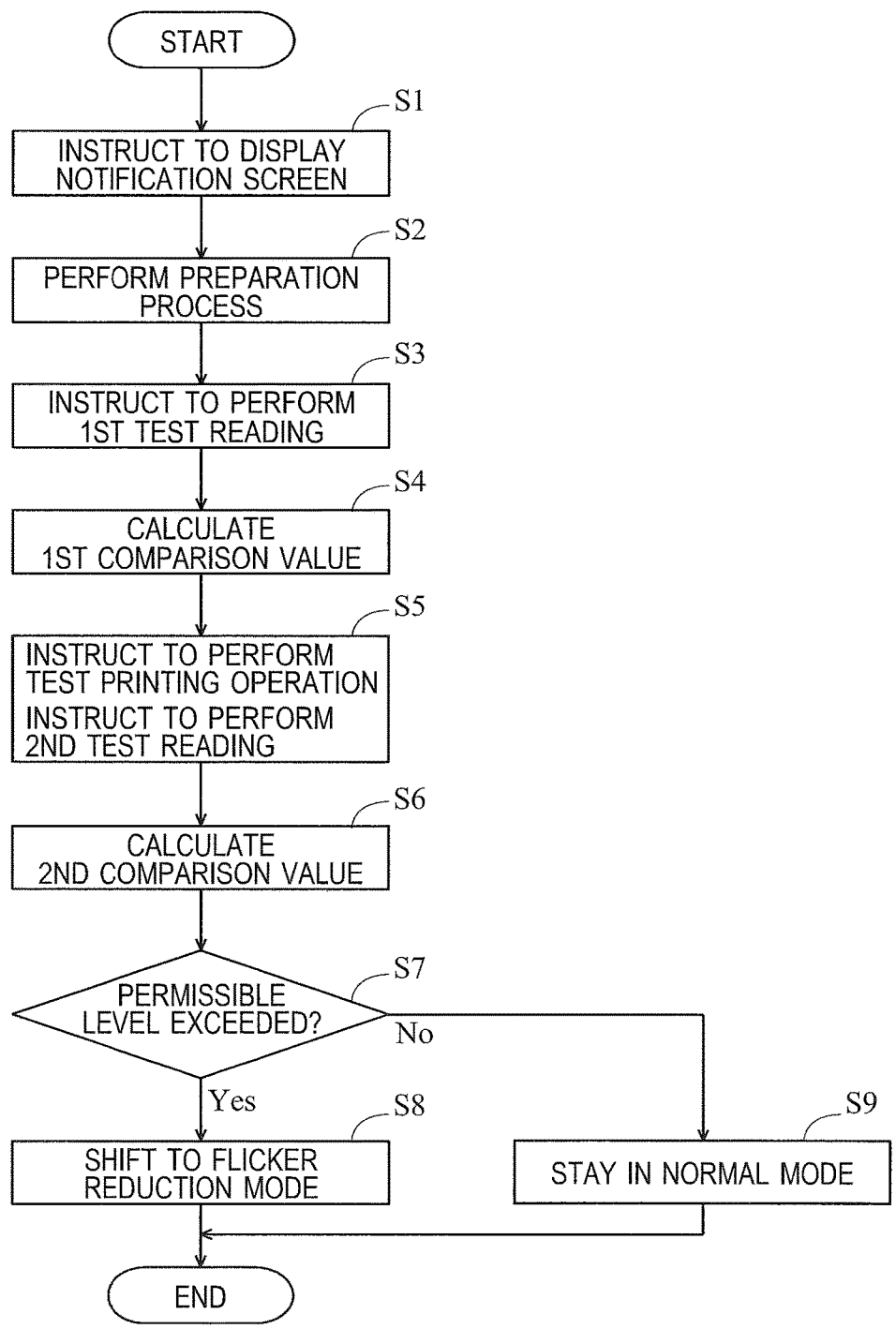
FIG. 5 is a flow chart showing a flow of a process performed by a control portion in the multifunction peripheral according to one embodiment of the present disclosure.

Now, with reference to the flow chart shown in FIG. 5, a flow of the flicker checking process performed by the control portion 4 will be described. The flow shown in FIG. 5 starts when an instruction to perform the flicker check function is received from the user on the operation panel 3. At the start of the flow shown in FIG. 5, the mode for the power supply control method is set to the normal mode.

Figure 6:
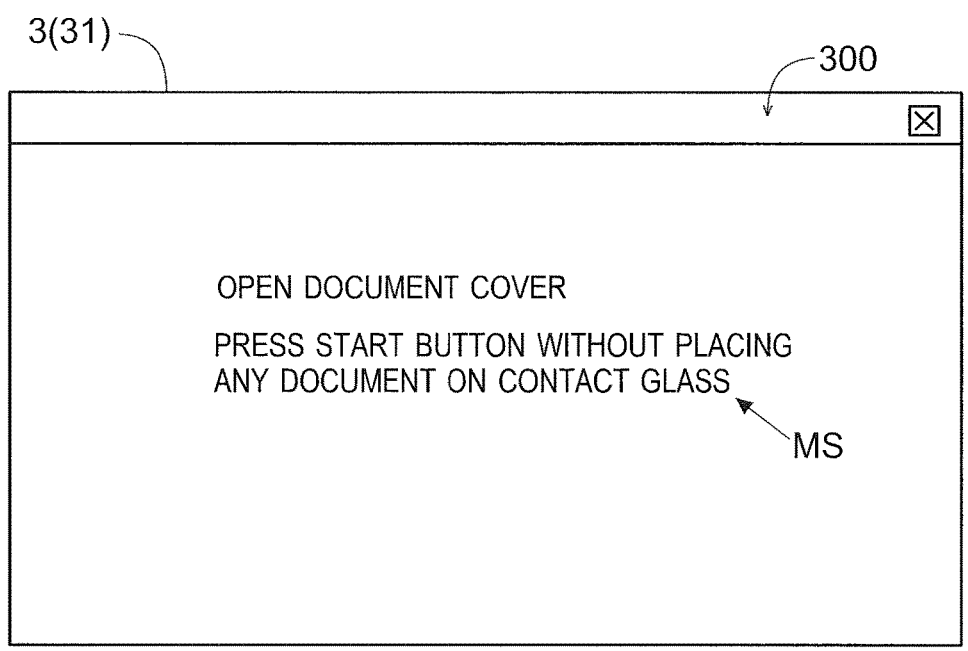
FIG. 6 is a diagram showing a notification screen displayed on an operation panel of the multifunction peripheral according to one embodiment of the present disclosure.

At step S1, the control portion 4 instructs the operation panel 3 to display a notification screen 300 as shown in FIG. 6. On the notification screen 300, a notification message MS is shown. When such a notification screen 300 is displayed on the operation panel 3, the user opens the document cover 101, and then performs start operation by pressing the Start button on the operation panel 3 without placing a document D on the contact glass CG.

The control portion 4 detects weather the document cover 101 is open or closed based on the output value of the open-close sensor 111. The control portion 4 detects also whether or not there is a document D on the contact glass CG. To enable the control portion 4 to detect whether or not there is a document D, in the housing 10, there can be provided a sensor that changes the output value between when a document D is placed on the contact glass CG and when no document D is placed on the contact glass CG, and the sensor can be connected to the control portion 4. Or, the image reading portion 1 can be configured to read the contact glass CG.

Thus, the control portion 4 takes, as valid, start operation performed with the document cover 101 open and in addition with no document D placed on the contact glass CG. In this case, the flow proceeds from step S1 to step S2. If start operation is performed with the document cover 101 closed or with a document D placed on the contact glass CG, the flow does not proceed to step S2.

Figure 7:
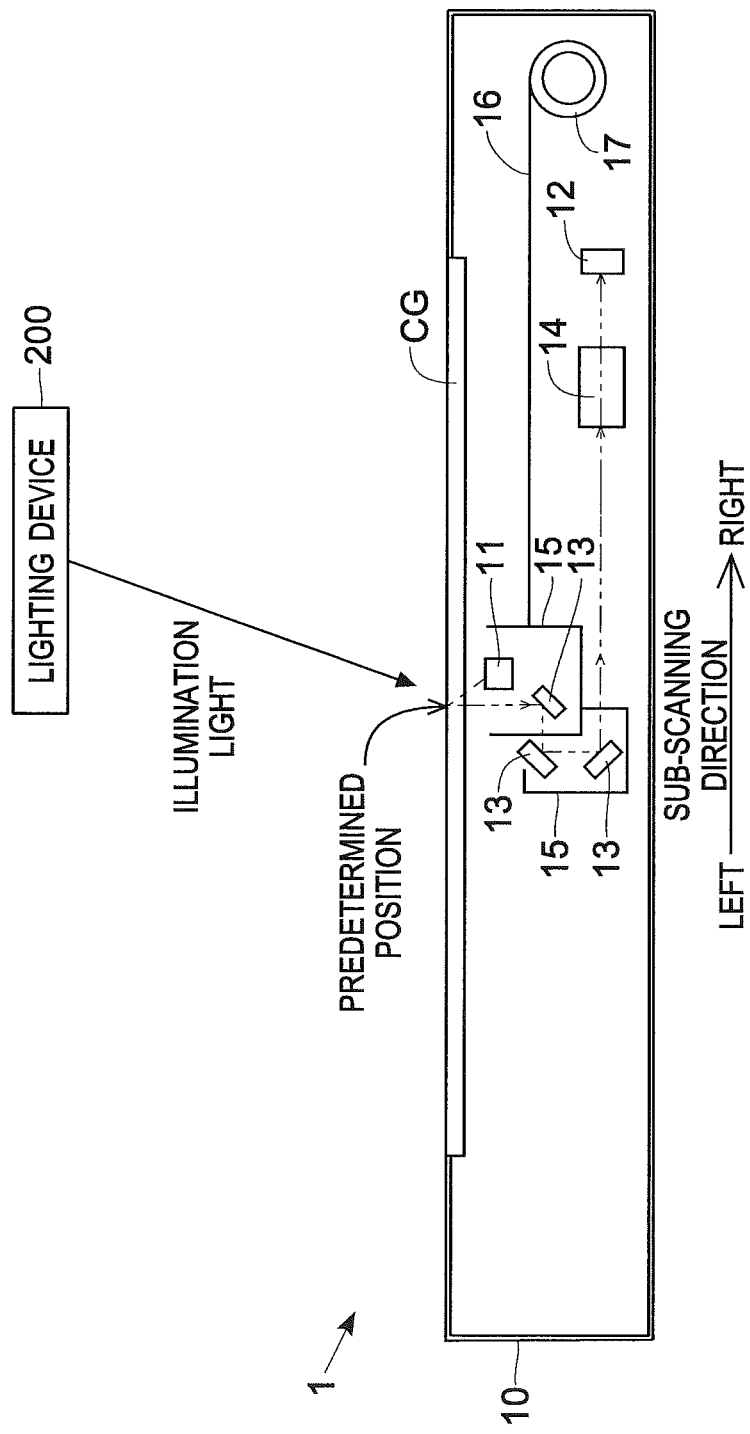
FIG. 7 is a diagram showing a reading position where first test reading and second test reading are performed by the image reading portion in the multifunction peripheral according to one embodiment of the present disclosure.

When the flow proceeds to step S2, the control portion 4 performs a preparation process. Here, as shown in FIG. 7, the control portion 4 moves the light source 11 in the sub-scanning direction such that the position at which reading is performed by the image reading portion 1 is at a predetermined position. For example, the middle position of the contact glass CG in the sub-scanning direction is set as the predetermined position.

With reference back to FIG. 5, at step S3, the control portion 4 instructs the image reading portion 1 to perform first test reading (image data generation). The image reading portion 1 performs, as the first test reading, main scanning-direction one-line reading of the contact glass CG at the predetermined position. The number of pixels contained in one line in the main scanning direction read by the image reading portion 1 is 7500. For example, in the image reading portion 1, when the first test reading is performed, electric charge is accumulated in the pixels of the image sensor 12 longer than when normal reading (reading performed when a normal job such as a copy job is executed) is performed.

At step S4, the control portion 4 calculates, based on first image data which is the image data acquired in the first test reading, a first comparison value which represents the brightness of the illumination light from the lighting device 200. Here, the control portion 4 takes, as the first comparison value, a first average value obtained by averaging the pixel values (gradation values) of a plurality of pixels contained in the first image data. There is no particular limitation on how to calculate the first comparison value. For example, out of the pixel values of the plurality of pixels contained in the first image data, the lowest value can be found, and the found lowest value can be taken as the first comparison value.

At step S5, the control portion 4 instructs the printing portion 2 to perform test printing operation. The control portion 4 makes the printing portion 2 perform, as the test printing operation, printing operation which is substantially the same as normal printing operation (printing operation performed when a normal job such as a copy job is executed). That is, the control portion 4 makes the conveyance motor M1, the drum motor M2, and the fixing motor M3 rotate individually. Thus, the plurality of conveying roller pairs 21, the photosensitive drum 231, the heating roller 241 rotate individually. The control portion 4 feeds electric power to the heater 243. Here, the power supply control method is the half-wave control method.

The control portion 4, when making the printing portion 2 perform the test printing operation, does not feed a sheet P into the sheet conveyance passage 20. That is, the control portion 4 does not drive the sheet feed portion 22. Thus, in the test printing operation performed by the printing portion 2, no sheet P is conveyed.

At step S5, the control portion 4 instructs the image reading portion 1 to perform second test reading (image data generation). The image reading portion 1 performs, as the second test reading, main scanning-direction one-line reading of the contact glass CG at the predetermined position (the same position as the position at which the first test reading is performed). For example, in the image reading portion 1, when the second test reading is performed, electric charge is accumulated in the pixels of the image sensor 12 longer (for the same duration as in the first test reading) than when normal reading is performed.

Here, the image reading portion 1 performs the second test reading a plurality of times. For example, the image reading portion 1 repeats the second test reading at equal intervals (for example, at intervals of 10 ms), and ends it when a predetermined time (for example, 5 seconds) has elapsed after the second test reading was performed for the first time. By the image reading portion 1 performing the second test reading a plurality of times, a plurality of sets of image data corresponding to the second test reading performed a plurality of times is generated respectively.

At step S6, the control portion 4 calculates, based on second image data which is the image data acquired in the second test reading, a second comparison value which represents the brightness of the illumination light from the lighting device 200. Here, the control portion 4 calculates, for each of the plurality of sets of second image data acquired by performing the second test reading a plurality of times, a second average value obtained by averaging the pixel values (gradation values) of a plurality of pixels contained in the second image data. Then, the control portion 4 takes, as the second comparison value, the lowest value out of a plurality of second average values corresponding, respectively, to the plurality of sets of second image data. Here, out of the pixel values of the plurality of pixels contained in the plurality of sets of second image data, the lowest value can be found, and the found lowest value can be taken as the second comparison value.

At step S7, the control portion 4 checks, based on the first and second comparison values, whether or not the flicker level of the illumination light from the lighting device 200 exceeds the permissible level.

Here, if, when the printing portion 2 performs the test printing operation, the illumination light from the lighting device 200 does not flicker noticeably (so strongly that the user would notice the flicker of the illumination light), the absolute value of the difference between the first and second comparison values is low.

On the other hand, if, when the printing portion 2 performs the test printing operation, the illumination light from the lighting device 200 flickers noticeably (when the illumination light becomes dark momentarily), a second average value corresponding to the second image data acquired in the second test reading when the illumination light flickers noticeably is lower than other second average values. This is because, when the illumination light flickers noticeably, less light passes through the contact glass CG to be incident on the image sensor 12. In this case, the second average value corresponding to the second image data acquired in the second test reading when the illumination light flickers noticeably is the second comparison value. Thus, as compared with in the case where the illumination light of the lighting device 200 does not flicker, the absolute value of the difference between the first and second comparison values is high.

Thus, the control portion 4, when checking whether or not the flicker level of the illumination light from the lighting device 200 exceeds the permissible level, calculates the absolute value of the difference between the first and second comparison values. Then, the control portion 4 checks whether or not the difference (the absolute value) between the first and second comparison values is equal to or higher than a predetermined threshold value. If, as a result, the difference (the absolute value) between the first and second comparison values is equal to or higher than the threshold value, the control portion 4 determines that the flicker level of the illumination light from the lighting device 200 exceeds the permissible level. On the other hand, if the difference (the absolute value) between the first and second comparison values is lower than the threshold value, the control portion 4 determines that the flicker level of the illumination light from the lighting device 200 does not exceed the permissible level.

For example, suppose, in the first test reading and the second test reading, 256-color 8-bit per pixel image data is generated, the lowest pixel value (stark black) being "0," the highest pixel value (stark white) being "255." In this example, the threshold value is set, for example, at "25." The threshold value can be changed as necessary, and the change is accepted on the operation panel 3.

In this example, let the first average value calculated based on the first image data acquired in the first test reading be "250." In this case, the first comparison value is "250."

Suppose the second average value of a set of the second image data out of a plurality of sets of second image data acquired by performing the second test reading a plurality of times is "220," and the second average values of the rest of the sets of the second image data is a value higher than "220." In this case, the second comparison value is "220."

When the first comparison value is "250" and the second comparison value is "220," the absolute value of the difference between the first and second comparison values is "30." That is, the absolute value is higher than the threshold value. Thus, in this example, the control portion 4 determines that the flicker level of the illumination light from the lighting device 200 exceeds the permissible level.

At step S7, if the control portion 4 determines that the flicker level exceeds the permissible level, the flow proceeds to step S8. On the other hand, if the control portion 4 determines that the flicker level does not exceed the permissible level, the flow proceeds to step S9.

If the flow proceeds to step S8, the control portion 4 changes the mode for the power supply control from the normal mode to the flicker reduction mode. If the flow proceeds to step S9, the control portion 4 keeps, as the mode for the power supply control, the normal mode.

With the configuration according to this embodiment, with the document cover 101 open and in addition with no document D placed on the contact glass CG, the first test reading and the second test reading are performed. Then, the first comparison value is calculated based on the first image data acquired in the first test reading, and the second comparison value is calculated based on the second image data acquired in the second test reading. Here, when the first test reading is performed, the printing portion 2 does not perform the printing operation, and when the second test reading is performed, the printing portion 2 performs the printing operation. Thus, if the illumination light from the lighting device 200 flickers noticeably (so strongly that the user would notice the flicker of the illumination light) as a result of the printing portion 2 performing the printing operation, as compared with in the case where the illumination light does not flicker noticeably, the difference between the first and second comparison values is large. Thus, by calculating the first and second comparison values, it is possible to quantitatively check whether or not the flicker level exceeds the permissible level.

Here, conventionally, an image forming apparatus is installed generally in a room, and at the place where the image forming apparatus is installed, a lighting device is installed. In such an environment, when the image forming apparatus performs printing operation, illumination light from the lighting device may flicker noticeably. If the illumination light from the lighting device flickers noticeably, it is preferable to make adjustments to the image forming apparatus so as to reduce the flicker of the illumination light from the lighting device.

Thus, conventionally, a maintenance service provider for image forming apparatuses subjectively checks whether or not the flicker level exceeds the permissible level, and determines, based on the result, whether or not adjustments are needed to reduce the flicker of the illumination light. However, how people feel the flicker of the illumination light from the lighting device differs from person to person. Thus, even if the user of the image forming apparatus finds the flicker of the illumination light from the lighting device noticeable, the maintenance service provider may determine that the flicker level is low. In this case, inconveniently, no adjustments are made to reduce the flicker of the illumination light from the lighting device. It can also occur, inconveniently, that adjustments to reduce the flicker of the illumination light from the lighting device are made unnecessarily even if the user of the image forming apparatus finds the flicker of the illumination light from the lighting device hardly noticeable.

On the other hand, with the configuration according to this embodiment, it is possible to quantitatively check whether or not the flicker level exceeds the permissible level. This makes it possible to suppress such inconveniences as are conventionally encountered.

In the configuration according to this embodiment, as described above, the image reading portion 1 generates a plurality of sets of second image data by performing the second test reading a plurality of times. Then, the control portion 4 takes, as a second comparison value, the lowest value out of a plurality of second average values corresponding to the plurality of sets of second image data. Thus, a second average value corresponding to the second image data acquired in the second test reading when the illumination light from the lighting device 200 flickers noticeably (when the illumination light becomes dark momentarily) is the second comparison value; it is thus possible to accurately check whether or not the flicker level exceeds the permissible level.

In the configuration according to this embodiment, as described above, the control portion 4 checks whether or not the absolute value of the difference between the first and second comparison values is equal to or higher than the threshold value, and if the absolute value is equal to or higher than the threshold value, the control portion 4 determines that the flicker level exceeds the permissible level. Here, when the illumination light from the lighting device 200 flickers noticeably, the difference between the first and second comparison values is large. On the other hand, even when the illumination light from the lighting device 200 flickers, if the flicker is unnoticeable, the difference between the first and second comparison values is small. Thus, by adopting a configuration where whether or not the flicker level exceeds the permissive level is checked based on whether or not the difference between the first and second comparison values is equal to or higher than the threshold value, it is possible to prevent the flicker level from being judged to exceed the permissible level when the flicker of the illumination light from the lighting device 200 is unnoticeable.

In the configuration according to this embodiment, as described above, the control portion 4, on determining that the flicker level exceeds the permissible level, shifts from the normal mode in which the power supply control is performed by the half-wave control method to the flicker reduction mode in which the power supply control is performed by the phase control method. Thus, it is possible, after the control portion 4 determines that the flicker level has exceeded the permissible level, to prevent the illumination light from the lighting device 200 from flickering noticeably.

In this embodiment, as described above, the control portion 4 does not feed a sheet P into the sheet conveyance passage 20 during the test printing operation which the control portion 4 makes the image reading portion 1 perform when making the image reading portion 1 perform the second test reading. This prevents a sheet P from being conveyed when the printing portion 2 performs the test printing operation. Here, a sheet P can be conveyed when the printing portion 2 performs the test printing operation. However, if a sheet P is conveyed, a jam may occur. If a jam occurs, jam operation has to be performed to remove the jammed sheet P. In some cases, the jammed sheet P may be torn in the jam operation. Even if no jam occurs, the sheet P conveyed when the test printing operation is performed (the sheet P discharged onto the discharge tray ET) needs to be returned to the sheet cassette CA. Thus, it is preferable that no sheet P be conveyed when the printing portion 2 performs the test printing operation.

It should be understood that the embodiments disclosed herein are in every aspect illustrative and not restrictive. The scope of the present disclosure is defined not by the description of embodiments given above but by the appended claims, and encompasses many modifications and variations made in the sense and scope equivalent to those of the claims.

What is claimed is:

1. An image forming apparatus comprising:
an image reading portion including a light source which radiates light toward a contact glass, the image reading portion reading the contact glass to generate image data;
a document cover supported to be openable and closable with respect to the contact glass;
a printing portion which conveys a sheet fed into a sheet conveyance passage, the printing portion printing an image on the sheet while conveying the sheet; and
a control portion which controls the image reading portion and the printing portion, wherein
the control portion,
    with the document cover open and in addition with no document placed on the contact glass, without making the printing portion perform printing operation, makes the image reading portion perform first test reading in which the contact glass is read without the light source being turned on, and
    after completion of the first test reading, makes the printing portion perform the printing operation, and makes the image reading portion perform second test reading in which the contact glass is read without the light source being turned on, and
the control portion,
    based on first image data acquired in the first test reading, calculates a first comparison value representing brightness of illumination light from a lighting device installed at a place where the image forming apparatus is installed,
    based on second image data acquired in the second test reading, calculates a second comparison value representing the brightness of the illumination light from the lighting device, and
    based on the first and second comparison values, checks whether or not a flicker level indicating intensity of a flicker of the illumination light from the lighting device exceeds a permissible level.

2. The image forming apparatus of claim 1, wherein the control portion takes, as the first comparison value, a first average value which is an average value of pixel values of a plurality of pixels contained in the first image data, and takes, as the second comparison value, a second average value which is an average value of pixel values of a plurality of pixels contained in the second image data.

3. The image forming apparatus of claim 2, wherein
the image reading portion generates a plurality of sets of second image data by performing the second test reading a plurality of times, and
the control portion takes, as the second comparison value, a lowest value out of a plurality of second average values corresponding to the plurality of sets of second image data.

4. The image forming apparatus of claim 1, wherein
the control portion checks whether or not an absolute value of a difference between the first and second comparison values is equal to or higher than a predetermined threshold value, and if the absolute value is equal to or higher than the threshold value, the control portion determines that the flicker level exceeds the permissible level.

5. The image forming apparatus of claim 1, wherein
the printing portion includes a heater which receives supply of AC power to produce heat when the printing operation is performed,
the control portion performs power supply control by turning on and off supply of electric power to the heater, and
the control portion, on determining that the flicker level exceeds the permissible level, shifts from a normal mode in which the power supply control is performed by a half-wave control method to a flicker reduction mode in which the power supply control is performed by a phase control method.

6. The image forming apparatus of claim 1, wherein
the control portion does not feed a sheet into the sheet conveyance passage during the printing operation which the control portion makes the printing portion perform when making the image reading portion perform the second test reading.

* * * * *